United States Patent [19]

Risk

[11] 4,000,754
[45] Jan. 4, 1977

[54] AUTOMATIC CONTROL VALVE FOR A FLUID SYSTEM

[75] Inventor: Daniel W. Risk, Whittier, Calif.

[73] Assignee: Maxton Manufacturing Company, Los Angeles, Calif.

[22] Filed: June 11, 1974

[21] Appl. No.: 463,933

[52] U.S. Cl. .............................. 137/487; 137/489; 137/492.5

[51] Int. Cl.² ........................................ G05D 7/01

[58] Field of Search .............. 137/489, 487, 489.5, 137/492.5, 486, 498, 505.15, 505.3, 505.35, 505.41, 509, 497, 501; 251/359, 360

[56] References Cited

UNITED STATES PATENTS

| 1,414,323 | 4/1922 | Barton | 251/360 X |
|---|---|---|---|
| 2,340,954 | 2/1944 | Garretson | 137/489 X |
| 2,418,743 | 4/1947 | Baker | 137/498 X |
| 2,600,073 | 6/1952 | Plank | 137/487 |
| 3,073,338 | 1/1963 | Cholvin et al. | 137/509 X |
| 3,107,688 | 10/1963 | Caslow | 137/498 X |
| 3,125,319 | 3/1964 | Arbogast et al. | 137/489 X |
| 3,143,134 | 8/1964 | Karpis | 137/489 X |
| 3,221,764 | 12/1965 | Elbogen et al. | 137/486 X |
| 3,298,390 | 1/1967 | DeGraaf | 137/489 X |

Primary Examiner—Alan Cohan
Attorney, Agent, or Firm—Jessup & Beecher

[57] ABSTRACT

An automatic control valve is provided for a fluid system where the valve can be adjusted to an equilibrium position based upon a selected flow rate through the valve, and further can automatically close the valve when an excessive flow rate occurs.

26 Claims, 2 Drawing Figures

AUTOMATIC CONTROL VALVE FOR A FLUID SYSTEM

BACKGROUND OF THE INVENTION

In a fluid system such as a hydraulic elevator system, the automatic sensing and control of system malfunction within a relatively short time is highly desirable. For example, the prompt detection and control of an overspeed condition in a hydraulic elevator system to prevent excessive escape of the hydraulic oil from an elevator system ram to a system reservoir so that the undesirable overspeed condition is effectively and efficiently controlled, and damage to the system and/or its cargo is prevented.

OBJECTS OF THE INVENTION

It is an object of the invention to provide a new and improved automatic control valve for a fluid system.

It is a further object of the invention to provide an automatic control valve that detects and responds to an excessive rate of fluid flow.

It is an object of the invention to provide an automatic control valve that detects an excessive rate of fluid flow and automatically controls the rate of flow.

It is an object of the invention to provide an automatic control valve that can be manually overridden and controlled.

It is an object of the invention to provide an automatic control valve that detects an excessive rate of fluid flow and automatically controls the rate of flow when the rate of flow exceeds a selected flow rate.

BRIEF SUMMARY OF THE INVENTION

In accordance with the invention, a new and improved automatic control valve for a fluid system is provided having a main valve body with first and second chambers interconnected by a port. An adjustable valve restricts the passage of fluid through the port and is controlled by fluid responsive valve actuator means that can be manually overridden. A first bypass conduit interconnects the first chamber and the valve actuator means, and controls the rate of flow of fluid from the first chamber to the valve actuator means. A second bypass conduit interconnects the second chamber and the valve actuator means. A regulator means, that is connected across the first and second bypass conduits, is responsive to the rate of fluid flow through the valve and is actuated by a fluid flow rate greater than a predetermined rate to restrict the second bypass conduit thereby developing a pressure buildup in the valve actuator means and enabling the valve actuator means to close the valve until the pressure unbalance across the valve is removed.

Thus, this invention provides a control regulator connected directly across first and second bypass conduits which is responsive to the rate of fluid flowing through a valve to automatically correct for overspeed conditions.

Further objects, features and the attending advantages of the invention will become more readily apparent when the following description is read with the accompanying drawing.

DESCRIPTION OF THE INVENTION

Figure 1:
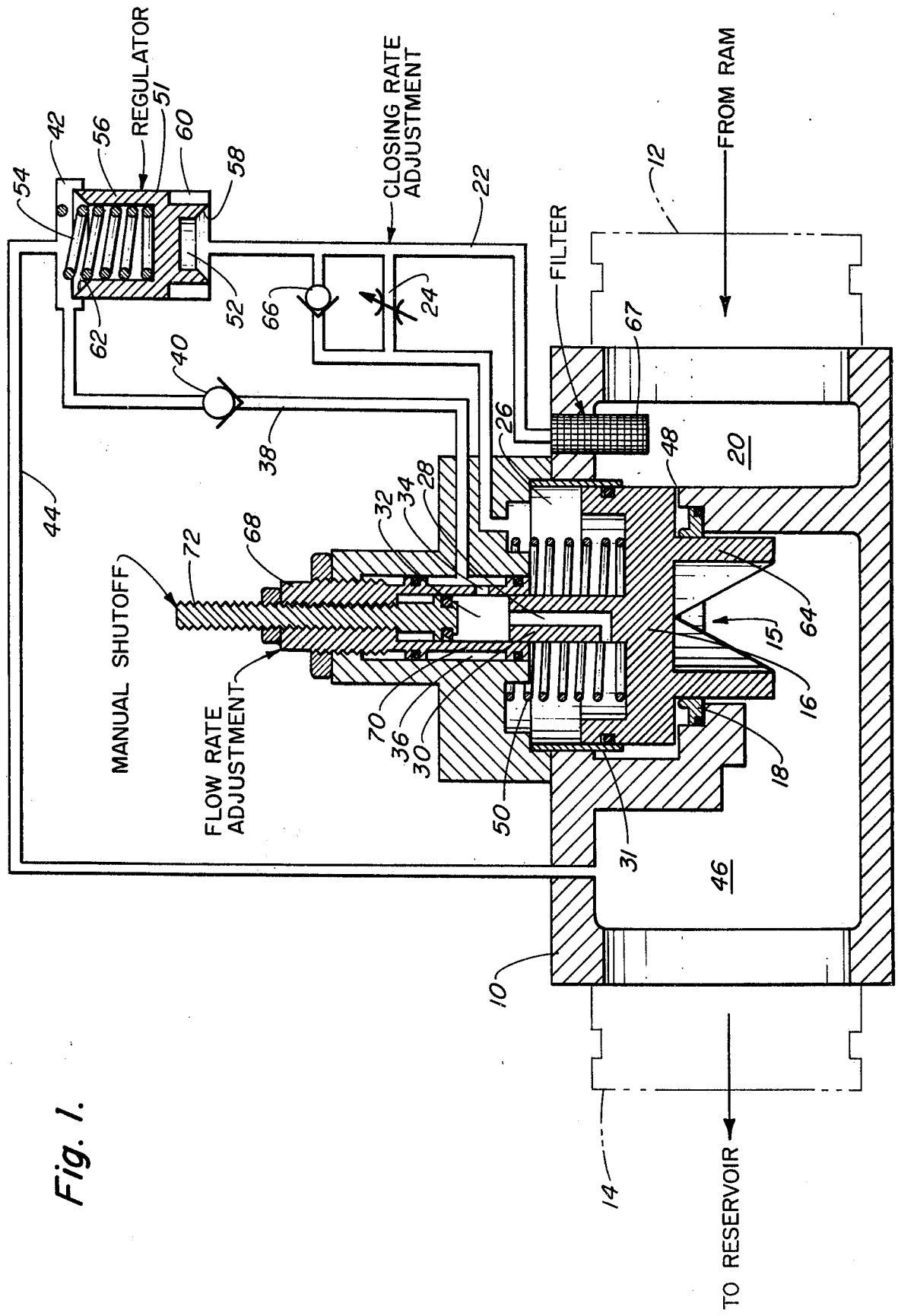
FIG. 1 is a cross-sectional view, partly schematic, of one form of the automatic control valve of the invention.

The automatic control valve of the invention is shown for illustration purposes as part of a hydraulic elevator system. It is contemplated that the automatic control valve may be employed in any fluid system where it is desirable to provide automatic detection and control of system parameters.

The automatic control valve has a main valve body 10 connected through pipe 12 to an elevator ram (not shown), and through pipe 14 to a hydraulic reservoir (not shown). The main valve body 10 has a first chamber 20 that is in fluid communication with the elevator ram through pipe 12, and a second chamber 46 that is in fluid communication with the reservoir through pipe 14. The first chamber 20 and the second chamber 46 are interconnected by port 15 which has a valve seat 18 to receive valve 16.

An obverse face of valve 16 is urged against the valve seat 18 by a valve actuator assembly that includes a valve spring 50 that is positioned within a third chamber 26 of the main valve body 10 in a generally concentric position with valve stem 30. Valve stem 30 has an axial passage 28 that places the third chamber 26 in fluid communication with a fourth chamber 32 in the main valve body 10. The fourth chamber 32 is in fluid communication with annular passage 36 through a valved port 34 in sleeve 70. Sleeve 70 serves as a guide for valve stem 30. Sleeve 70 has a threaded adjuster stem 68 that is adjustable relative to main valve body 10 and, in particular, relative to valve stem 30, particularly the distal end of valve stem 30, and its relationship to sleeve port 34 as will be described hereinafter in more detail. A threaded blocking screw 72 is carried by adjuster stem 68 and is adapted to be manually positioned to limit the travel of valve 16 relative to valve seat 18 by impinging upon the distal end of valve stem 30. Blocking screw 72 can thus, if desired, even be manually positioned to hold valve 16 against valve seat 18.

The valve actuator assembly as described hereinbefore is maintained in fluid communication with the first and second chambers 20 and 46 through bypass conduits. Bypass conduit 22 places the first chamber 20 of the main valve body 10 in fluid communication with the third chamber 26 of the valve actuator assembly through an adjustable restrictive valve 24. A second bypass conduit has a first portion 38 that places the annular passage 36, and fourth chamber 32 through port 34, in fluid communication with a regulator chamber 42 of a regulator connected across the first and second bypass conduits. A second portion 44 of the second bypass conduit places the regulator chamber 42 in fluid communication with the second chamber 46 of the main valve body 10. A check valve 40 in the first portion 38 of the second bypass conduit prevents the flow of a fluid from the regulator chamber 42 to the annular passage 36.

The first bypass conduit 22 is also connected to a control valve 51 having a regulator chamber 52 which is defined by the knife-edge portion 58 of the obverse face of the regulator piston 56 as it seats against the regulator body under the constant urging of regulator spring 54. The knife-edge portion 58 separates the regulator chamber 52 from a surrounding annular chamber 60 that is placed in fluid communication with the chamber 52 whenever the knife-edge portion 58 is urged away from its seat against the regulator body. A similar knife-edge portion 62 formed on the reverse face of regulator piston 56 seats against the regulator body in regulator chamber 42 whenever the regulator piston 56 compresses the regulator spring 54 sufficiently to move the knife-edge portion 62 into the chamber 42 to seat against the regulator body.

A check valve 66 in a branch portion of the first bypass conduit 22 which is in parallel with the restrictive valve 24 bypasses fluid from the chamber 26 to the chamber 20. A conventional filter element 67 between the first chamber 20 and the bypass conduit 22 completes the first bypass circuit.

Operatively, the automatic control valve of the invention, under normal valve operating conditions, sees a pressure differential or drop develop across the valve 16. The first chamber 20 experiences a fluid pressure $P_1$ from the elevator ram, while the second chamber 46 experiences a fluid pressure $P_2$ in common with the fluid reservoir. Under normal conditions, pressure $P_1$ is greater than pressure $P_2$ and the differential is maintained by the adjustable restrictive valve 24 in the bypass conduit.

The fluid, which is at pressure $P_1$ in the fluid chamber 20, enters an annular passage 48 that surrounds valve seat 18 and urges the valve 16 away from the valve seat against the constant urging of valve spring 50. A position of equilibrium is established when the valve stem 30 is displaced to a position that partially covers port 34 and thereby restricts the flow of fluid from the fourth chamber 32 into the annular passage 36 that connects through the first and second portions 38 and 44 of the second bypass conduit to the second chamber 46 of the main valve body 10.

As the equilibrium position is reached, the volume of fluid passing through restrictive valve 24 equals the volume of fluid passing through the partially restricted port 34. This results in a displacement force on valve 16 that is balanced by a restoring force which is the total of the force developed by the fluid pressure in the third chamber 26 and the reactive force of the compressed valve spring 50.

The amount that valve 16 will open during normal valve operating conditions is determined by the setting of the restrictive valve 24 and the adjustment of the location of port 34. When the adjuster stem 68 is screwed out of the main valve body 10, the distance the valve stem 30, and thus the valve 16, must travel before partially restricting the port 34 is increased with a corresponding increase in the port opening 15. This, in turn, permits an increased rate of fluid flow through the valve port 15 between the first and second chambers 20 and 46.

Similarly, when the adjuster stem 68 is screwed into the main valve body 10, the equilibrium position of the valve is decreased with a corresponding decrease of fluid flow through the valve body.

Under abnormal valve operating conditions, the automatic control valve 51 sees an increasing pressure differential develop across the valve. This can be correlated to an excessive flow rate of the fluid passing through the valve body. When this flow rate reaches a selected value, as determined by the setting of the adjustable restrictive valve 24, the pressure drop across the regulator between regulator chamber 52, which is in fluid communication with the first chamber 20 through bypass conduit 22, and regulator chamber 42, which is in fluid communication with the second chamber 46 through bypass conduit portion 44, actuates the regulator piston 56. As this selected value is reached, the pressure in regulator chamber 52 overcomes the bias of regulator spring 54 and displaces the regulator piston and thus the knife-edge portion 58. When the knife-edge portion 58 lifts from its seat, the added pressure area of the annular chamber 60 sharply increases the displacement force acting upon regulator piston 56. This increased force pops the knife-edge portion 62 of the regulator piston 56 into its seat and shuts off the bypass conduit portion 38 from bypass conduit portion 44. This causes the pressure within the annular passage 36 and the third and fourth chambers 26 and 32 to increase rapidly since the fluid entering the third chamber 26 through restrictive valve 24 has no way to escape. When this happens, the restoring force on valve 16 is greater than its displacement force so that valve 16 closes against its valve seat 18 to shut off further flow of fluid through the valve body. Normal operation of the automatic control valve occurs when the pressure drop across the regulator piston 56 falls far enough below the selected value to allow the regulator piston to return to its normal position. This reseats knife-edge portion 58 against the regulator body to isolate the annular chamber 60, and unseats the knife-edge portion 62 to open fluid communication between the bypass conduit portions 38 and 44 through regulator chamber 42.

Check valve 66 allows the rapid escape of fluid from the third chamber 26 so that valve 16 can open rapidly. This is necessary (1) when the automatic control valve is to return to normal operation following an abnormal situation as described hereinbefore, and (2) when a reverse flow of fluid is required from the second chamber 46 through the valve port 15 to the first chamber 20, i.e., when the pressure $P_2$ in chamber 46 is greater than the pressure $P_1$ in chamber 20.

Similarly, check valve 40 prevents the buildup of high pressure in the bypass conduit portion 38, which would seat piston 16, when the reverse flow of fluid is desired from the second chamber 46 through the valve port 15 to the first chamber 20.

Central screw 72 provides a manual shut-off of the automatic control valve of the invention by forcing the valve 16, through engagement with the valve stem 30, into its closed position against the valve seat 18. Alternatively, displacement of the central screw 72 towards the valve stem 30 limits the travel of the piston away from its valve seat 18 so that a large pressure drop from the first chamber 20 to the second chamber 46 automatically trips the regulator piston 56 to effect the closing of the valve 16 against the valve seat 18.

Figure 2:
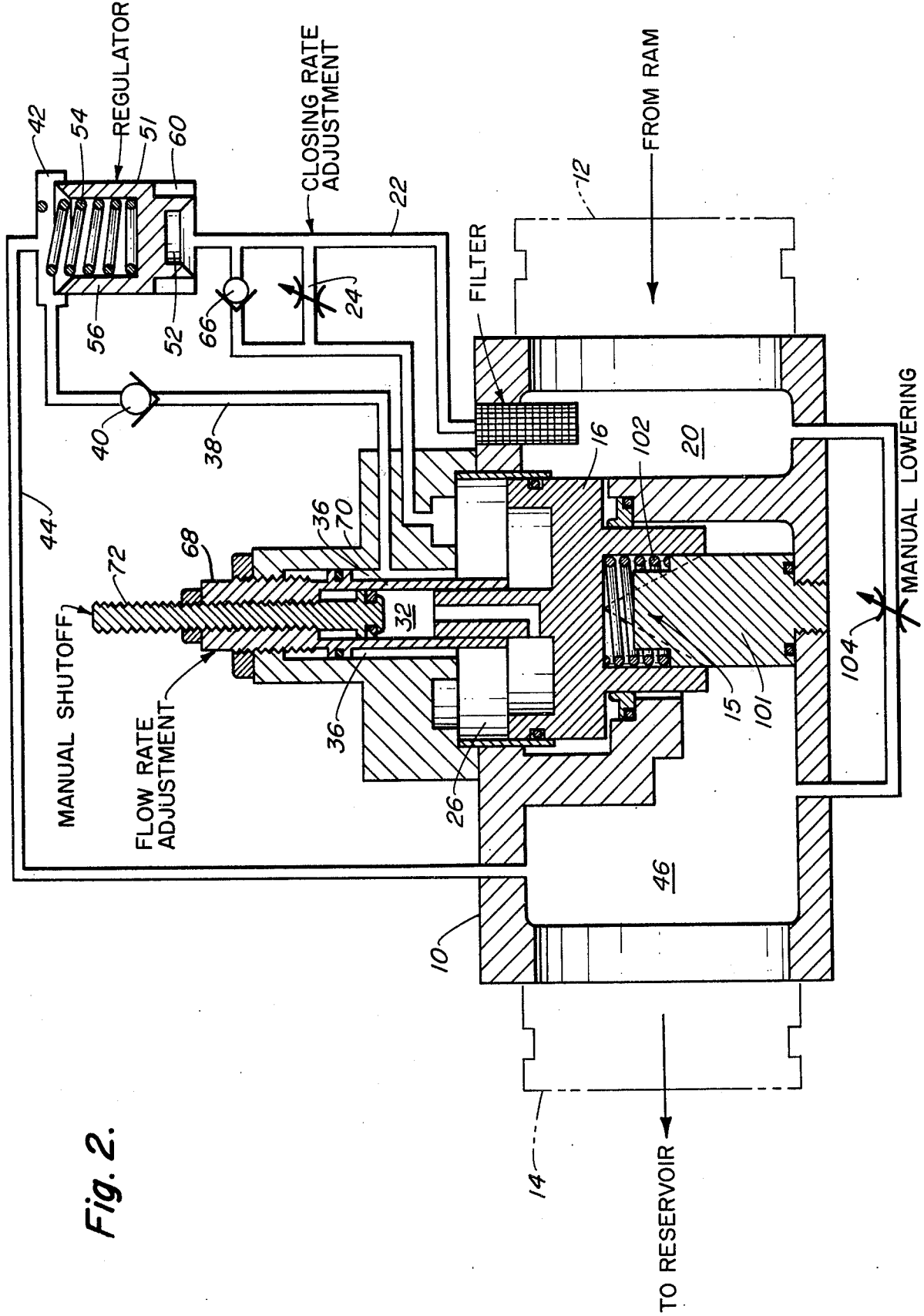
FIG. 2 illustrates a second form of the valve.

A second form of the present invention is shown in FIG. 2, wherein the system is substantially the same as shown in FIG. 1, with the following differences.

The open position of the valve 16, when fluid is flowing from the first chamber 20 to the second chamber 46, instead of being determined by the positioning of the valve stem 30 relative to the radial port 34, is determined by a fixed stop constituted by the lower end of the sleeve 70 of the adjuster stem 68. In the embodiment of FIG. 2, the valving between the stem 30 and the port 34 is eliminated, and fluid is allowed to flow freely from the chamber 26 through the radial passage 36 and into the conduit 38.

Within the second chamber 46 is mounted a stud or boss 101 forming a pedestal for a biasing spring 102 that biases the valve 16 upwardly toward the stop sleeve 70.

In typical operation, fluid under pressure from the ram at 12 flows from the first chamber 20 through the port 15 to the chamber 46, since the valve 16 is already held open by the spring 102. When the pressure drop across the port 15 rises to a predetermined value by virtue of excessive flow rate from chamber 20 to chamber 46, this pressure drop, which is also the pressure drop from chamber 52 to chamber 42 in the regulator or control valve 51, overcomes the bias of the regulator spring 54 and moves the piston 56 upward, closing off the conduit 44 at the chamber 42.

As noted, there is an inherent hysteresis in this action, because the moment that the piston 56 starts to rise, the area at the bottom of the piston 56 which is exposed to the pressure in chamber 20 increases, by virtue of the uncovering of the annular chamber 60, and this abruptly enhances the force differential tending to keep the control valve 51 closed, with consequent blocking of the bypass conduit 44. Thus the pressure differential from 20 to 46 must drop appreciably below that value which caused the control valve 51 to close before the spring 54 can again move the piston 56 to open position.

FIG. 2 also illustrates the inclusion, if desired, of a manual lowering means in the form of a manually operable valve 104 bypassing the valve 16, by means of which full control between chambers 20 and 46 may be manually achieved, if desired. As in the FIG. 1 modification, the FIG. 2 form also provides for a complete manual shut-off of the valve 16 by the screwing down of the manual shut-off screw 72.

The form of the invention shown in FIG. 2 has the advantage over FIG. 1 that the magnitude of the port opening at 15, when fluid flows from chambers 20 to 46, is independent of such fluid pressure changes as might be caused by miscellaneous variables in the system. It has a disadvantage over the system shown in FIG. 1, in that since the flow rate for down flow of fluid from chamber 20 to chamber 46 must be adjusted to a fixed valve opening by mechanical adjustment of the sleeve 70, this same fixed valve opening will prevail when the fluid flows from chamber 46 to chamber 20. In the embodiment shown in FIG. 1, flow from chamber 46 to chamber 20 causes the valve 16 to open fully — farther than it would open when flow is in the other direction, and this full opening is usually desired in the up direction. As noted, the embodiment shown in FIG. 2 is limited in that the opening of valve 16, both in the up flow and down flow mode, is limited by the physical stop 70.

As will be evidenced from the foregoing description, certain aspects of the invention are not limited to the particular details of construction as illustrated, and it is contemplated that other modifications and applications will occur to those skilled in the art. It is, therefore, intended that the claims shall cover such modifications and applications that do not depart from the true spirit and scope of the invention.

What is claimed is:

1. An automatic control valve for a fluid system comprising:
   a valve body,
   first and second chambers in said valve body in fluid communication with the fluid system,
   a port in said valve body interconnecting said first and second chambers for the passage of a fluid therethrough,
   adjustable valve means for restricting the passage of the fluid through said port,
   fluid responsive valve actuator means for positioning said valve means in relationship to said port to restrict the passage of the fluid therethrough,
   first bypass conduit means interconnecting said first chamber and said valve actuator means in fluid communication,
   second bypass conduit means interconnecting said second chamber and said valve actuator means in fluid communication, and
   control valve regulator means, connected across said first and second bypass conduit means, said regulator means sensing a pressure drop across said regulator means that is greater than that corresponding to a predetermined position of said valve means that reflects an acceptable fluid flow rate through the valve, for actuating said valve actuator means to close said valve means thereby blocking flow of fluid through the valve.

2. The automatic control valve of claim 1 in which said port includes a valve seat having an annular passage surrounding said valve seat in fluid communication with said first chamber.

3. The automatic control valve of claim 2 in which said valve means includes a movable valve having an obverse face adapted to engage said valve seat, said valve having a peripheral portion of said obverse face cooperating with said annular passage.

4. The automatic control valve of claim 3 in which said valve is continuously urged toward and selectively into said engagement with said valve seat by a spring means.

5. The automatic control valve of claim 3 in which said valve actuator means includes:
   a third chamber in said valve body in fluid communication with said first bypass conduit means,
   a fourth chamber in said valve body in fluid communication with said second bypass conduit means,
   an unrestricted fluid passage connecting said third and fourth chambers in fluid communication, and
   an adjustable fluid flow means controlling the flow of fluid from said fourth chamber to said second bypass conduit means and thereby said equilibrium position.

6. The automatic control valve of claim 5 in which said third chamber has a variable volume determined by a movable chamber wall.

7. The automatic control valve of claim 6 in which said movable chamber wall is a reverse face of said valve.

8. The automatic control valve of claim 7 in which said reverse face of said valve includes an outwardly extending valve stem having a distal end.

9. The automatic control valve of claim 8 in which said adjustable flow means includes an adjustable sleeve in said valve body adapted to receive said valve stem and a sleeve port in said sleeve placing said fourth chamber in fluid communication with said second bypass conduit means, said equilibrium position defined by the spatial relationship between said sleeve port and said distal end of said valve stem as determined by said adjustable sleeve position.

10. The automatic control valve of claim 9 in which an increased spatial relationship develops a corresponding increase in said equilibrium position.

11. The automatic control valve of claim 8 in which said fourth chamber has a variable volume determined by first and second movable chamber walls where said first movable chamber wall is said distal end of said valve stem.

12. The automatic control valve of claim 11 in which said valve actuator means further includes an adjustable screw in said adjustable sleeve, said adjustable screw having a distal end forming said second movable chamber wall of said fourth chamber and selectively engaging said distal end of said valve stem.

13. The automatic control valve of claim 12 in which said selective engagement of said distal end of said adjustable screw with said distal end of said valve stem forces said valve into a fluid seal engagement with said valve seat.

14. The automatic control valve of claim 8 in which said unrestricted fluid passage is in said valve stem.

15. The automatic control valve of claim 5 in which said first bypass conduit means includes an adjustable restrictive valve means permitting the controlled flow of the fluid from said first chamber into said third chamber.

16. The automatic control valve of claim 5 in which said regulator means includes:
a regulator body,
a regulator piston slidable in said regulator body defining a first regulator chamber in fluid communication with said first bypass conduit means and further defining a second regulator chamber in fluid communication with said second bypass conduit means,
an obverse face of said regulator piston in said first regulator chamber,
a reverse face of said regulator piston in said second regulator chamber,
a knife-edge portion on each of said obverse and reverse faces, and
spring means urging said knife-edge portion of said obverse face into said regulator body at a pressure drop no greater than that developed by said predetermined equilibrium position of said valve means.

17. The automatic control valve of claim 16 in which said first regulator chamber includes a third regulator chamber selectively placed in fluid communication with said first regulator chamber when a pressure drop greater than that developed by said predetermined equilibrium position occurs, said first and third regulator chamber volumes being additive to overcome said spring means and displace said regulator piston toward said second regulator chamber forcing said reverse face knife-edge portion into said regulator body so that said second bypass conduit means is closed and fluid communication from said fourth chamber to said second chamber is stopped.

18. The automatic control valve of claim 17 in which said obverse face knife-edge portion is displaced from said regulator body at the pressure drop greater than that developed by said predetermined equilibrium position placing said first and third regulator chambers in fluid communication.

19. The automatic control valve of claim 15 in which said first bypass conduit means includes a check valve permitting the bypass flow of the fluid from said third chamber into said first chamber.

20. The automatic control valve of claim 16 in which said second bypass conduit means includes a check valve preventing the flow of the fluid from said second chamber through said second regulator chamber into said fourth chamber.

21. The automatic control valve of claim 5 in which said first bypass conduit means includes a filter element.

22. An automatic control valve for a fluid system comprising:
a valve body,
first and second chambers in said valve body in fluid communication with the fluid system,
a port in said valve body interconnecting said first and second chambers for the passage of a fluid therethrough,
adjustable valve means for controlling the flow of fluid through said port,
fluid responsive valve actuator means for positioning said valve means in relationship to said port to control the passage of the fluid therethrough,
first bypass conduit means for interconnecting said first chamber and said valve actuator means in fluid communication,
second bypass conduit means for interconnecting said second chamber and said valve actuator means in fluid communication,
control valve means connected across said first and second bypass conduit means for porting fluid flow through said second bypass conduit,
means responsive to pressure differential between said first and second chambers for closing said control valve means when said pressure differential exceeds a predetermined value,
thereby to build up pressure on said valve actuator means and close said port.

23. Valve in accordance with claim 22 wherein said first bypass conduit means includes fluid restriction means.

24. Valve in accordance with claim 22 wherein said valve actuator means includes a cylinder and piston movable therein to position said valve means,
an adjustable stop for adjustably limiting the movement of said piston,
and a spring biasing said piston toward said stop.

25. Valve in accordance with claim 22 wherein said control valve means includes a cylinder and piston movable therein,
one face of said piston being subjected to pressure in said first chamber, the other face being subjected to pressure in said second chamber, the piston area subjected to said second chamber pressure being greater than the piston area subjected to said first chamber pressure,
said control valve means being actuated by movement of said piston in response to said pressure differential.

26. Valve in accordance with claim 25 wherein said control valve means also includes a spring biasing said control valve means to open position.

* * * * *